United States Patent [19]

Kitamura et al.

[11] 4,342,110
[45] Jul. 27, 1982

[54] RECORD DISC PLAYING APPARATUS WITH AUTOMATIC CANCELLATION OF INSIDE FORCE ON TONE ARM

[75] Inventors: Masatsugu Kitamura, Atsugi; Hideo Onoye, Yamato; Fumiaki Ohno, Fujisawa; Tsuyoshi Ono, Yamato; Yukihiro Kishima, Fujisawa; Yutaka Morita, Yokohama, all of Japan

[73] Assignee: Victor Company of Japan Ltd., Yohama, Japan

[21] Appl. No.: 165,372

[22] Filed: Jul. 2, 1980

[30] Foreign Application Priority Data

Jul. 6, 1979 [JP] Japan .................................. 54/85573

[51] Int. Cl.³ ............................................ G11B 17/06
[52] U.S. Cl. ...................................... 369/252; 369/33
[58] Field of Search .............................. 369/250–252, 369/33

[56] References Cited

U.S. PATENT DOCUMENTS

| 3,503,615 | 3/1970 | Matsuda | 369/33 |
| 4,114,893 | 9/1978 | Leach et al. | 369/33 |
| 4,184,688 | 1/1980 | Omura et al. | 369/226 X |
| 4,234,836 | 11/1980 | Gaus et al. | 369/252 X |

*Primary Examiner*—Charles E. Phillips
*Attorney, Agent, or Firm*—Michael N. Meller; Anthony H. Handal

[57] ABSTRACT

A record disc playing apparatus comprises a horizontal drive motor for imparting a horizontal rotational force to a tone arm an address signal generating device for generating an address signal corresponding to a horizontal rotational angle position of the tone arm and a control device including a memory device for storing the magnitude of an inside force to be produced on the tone arm in correspondence with the horizontal rotational angle position of the tone arm. The address signal generating device supplies the generated address signal to the control device. The control device reads out the magnitude of the inside force from the memory device corresponding to the supplied address signal, produces a signal for cancelling the inside force at the rotational angle position of the tone arm corresponding to the read out magnitude of the inside force and supplies the same to the horizontal drive motor.

7 Claims, 10 Drawing Figures

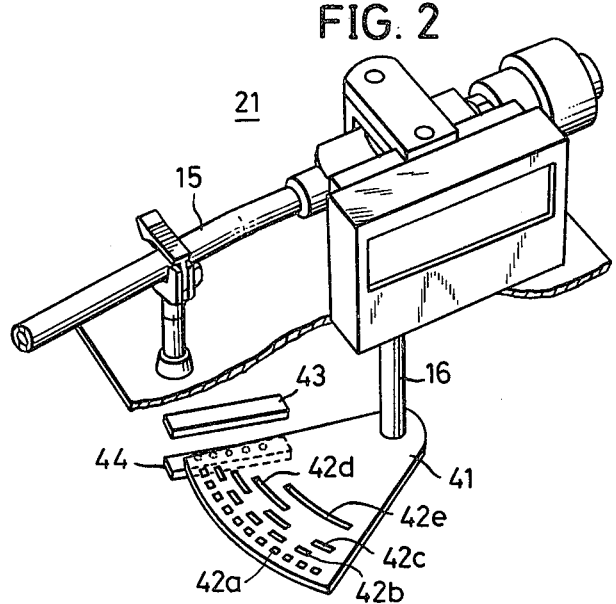

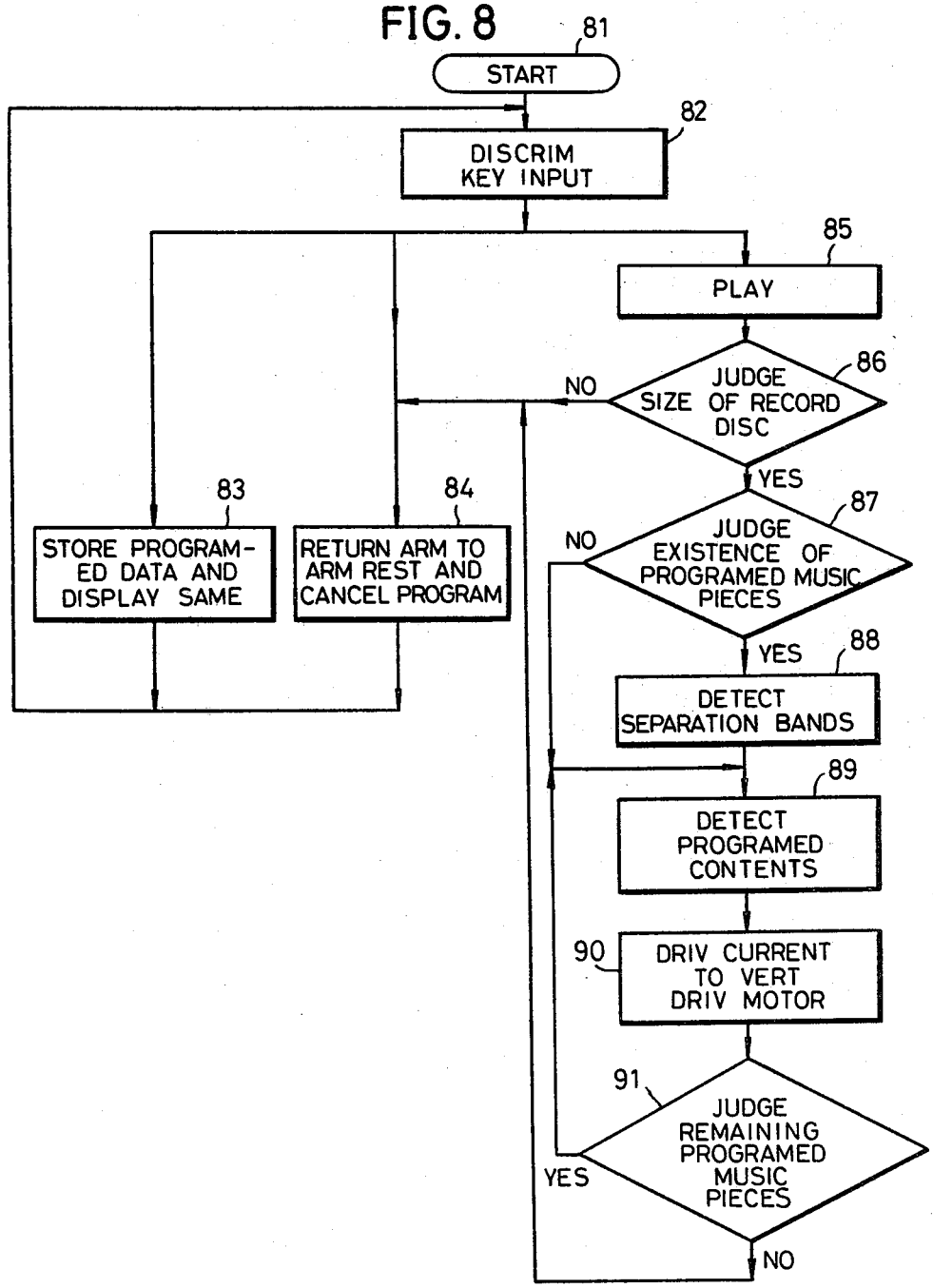

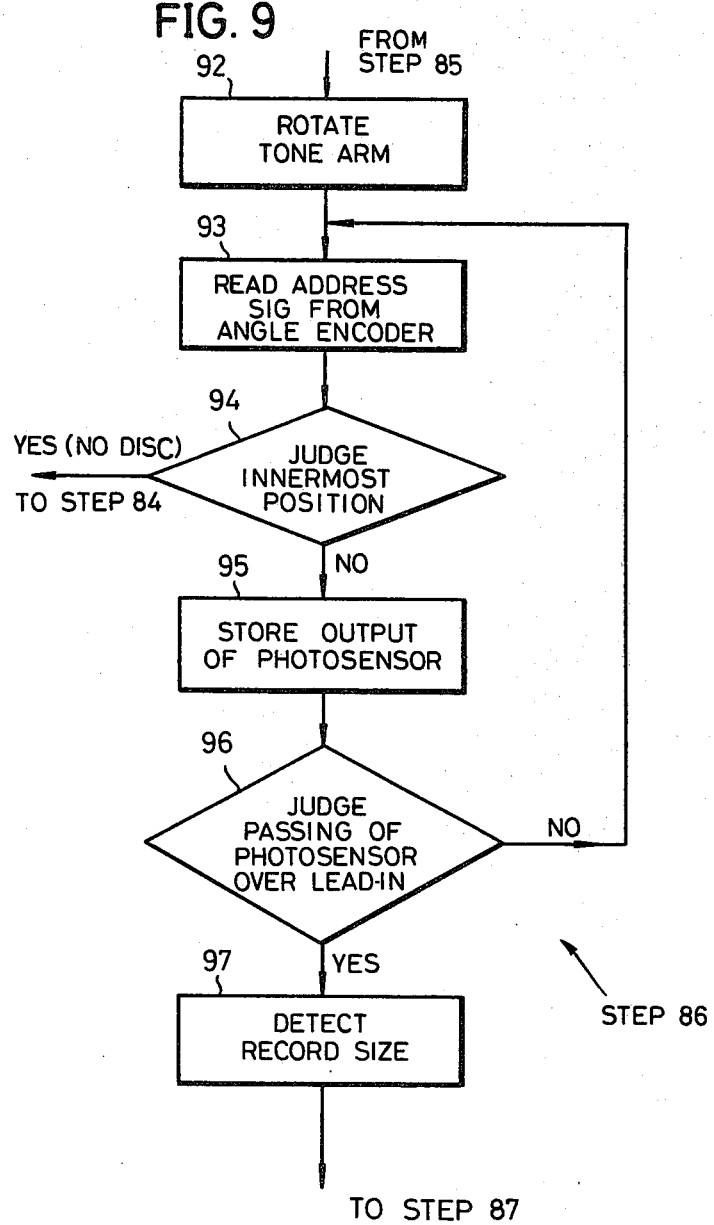

RECORD DISC PLAYING APPARATUS WITH AUTOMATIC CANCELLATION OF INSIDE FORCE ON TONE ARM

BACKGROUND OF THE INVENTION

This invention relates to record disc playing apparatuses capable of automatically cancelling inside force on their tone arms, and more particularly to a record disc playing apparatus adapted to automatically cancel the inside force continually in an appropriate manner in accordance with the rotational angular position of its tone arm.

In general, in a record disc playing apparatus of the type having a tone arm supported so that it can rotate about a vertical pivotal axis, as the tone arm moves in swing rotation, a tracking error of the stylus of the pickup cartridge mounted on the outer end of the tone arm relative to the record disc arises as a natural occurrence, and a distortion is introduced into the reproduced signal. Accordingly, in order to reduce the tracking error angle to minimum, the tone arm is provided appropriately with an offset angle and an overhang, as is known.

However, in a tone arm having an offset angle as mentioned above, an inside force arises, as is known, and, as a consequence, there are caused adverse occurrences such as increase of the distortion in the reproduced signal, lowering of the tracking performance, and abnormal abrasive wear of the stylus tip. The magnitude of this inside force is substantially proportional to the stylus pressure up to a value thereof of approximately 3 grams (g.).

Accordingly, measures and means for applying a force in the direction (outward) for cancelling this inside force to the tone arm, that is, means for accomplishing a so-called inside force cancellation, have heretofore been used. In one example of these known inside force cancellation means, the force due to a weight is transmitted as an outside force by a thread to the tone arm. However, the inside force varies with variation of the position of the tone arm relative to the record disc and, furthermore, changes also with the magnitude of the stylus pressure. As a consequence, in this known means for inside force cancellation, since the outside force applied to the tone arm is constant, it has been impossible to cancel accurately and positively the inside force continually varying with the position of the tone arm.

SUMMARY OF THE INVENTION

Accordingly, it is a general object of the present invention to provide a novel and useful record disc playing apparatus capable of automatically cancelling the inside force in which the above described difficulties have been overcome.

Another and specific object of the invention is to provide a record disc playing apparatus adapted to detect the rotational angle of the tone arm and to nullify the inside force by applying to the tone arm an appropriate outside force varying in accordance with the angular position of the tone arm thus detected. By this provision of the invention, the inside force can be accurately and positively nullified at all times irrespective of the rotational angular position of the tone arm.

Still another object of the invention is to provide a record disc playing apparatus having the capability of automatically cancelling the inside force by which it can automatically carry out appropriate inside force nullification even when the stylus pressure is variably adjusted.

Other objects and further features of the invention will be apparent from the following detailed description when read in conjunction with the accompanying drawings.

BRIEF DESCRIPTION OF THE DRAWINGS

In the drawings:

FIG. 2 is a perspective view, with parts cut away, of one embodiment of a tone arm angle encoder according to the invention in the apparatus shown in FIG. 1;

FIG. 3 is an elevation, with parts in vertical section, showing an example of a photosensor in the apparatus shown in FIG. 1;

FIG. 4 is an enlarged fragmentary view, in section, for a description of the state of reflection at the surface of a record disc of light from a light source of the photosensor;

FIG. 8 is a flow chart for a description of the operation of the apparatus illustrated in FIG. 1; and FIG. 9 is a flow chart indidcating in detail the steps in one portion of the operation indicated in FIG. 8.

DETAILED DESCRIPTION

Figure 1:
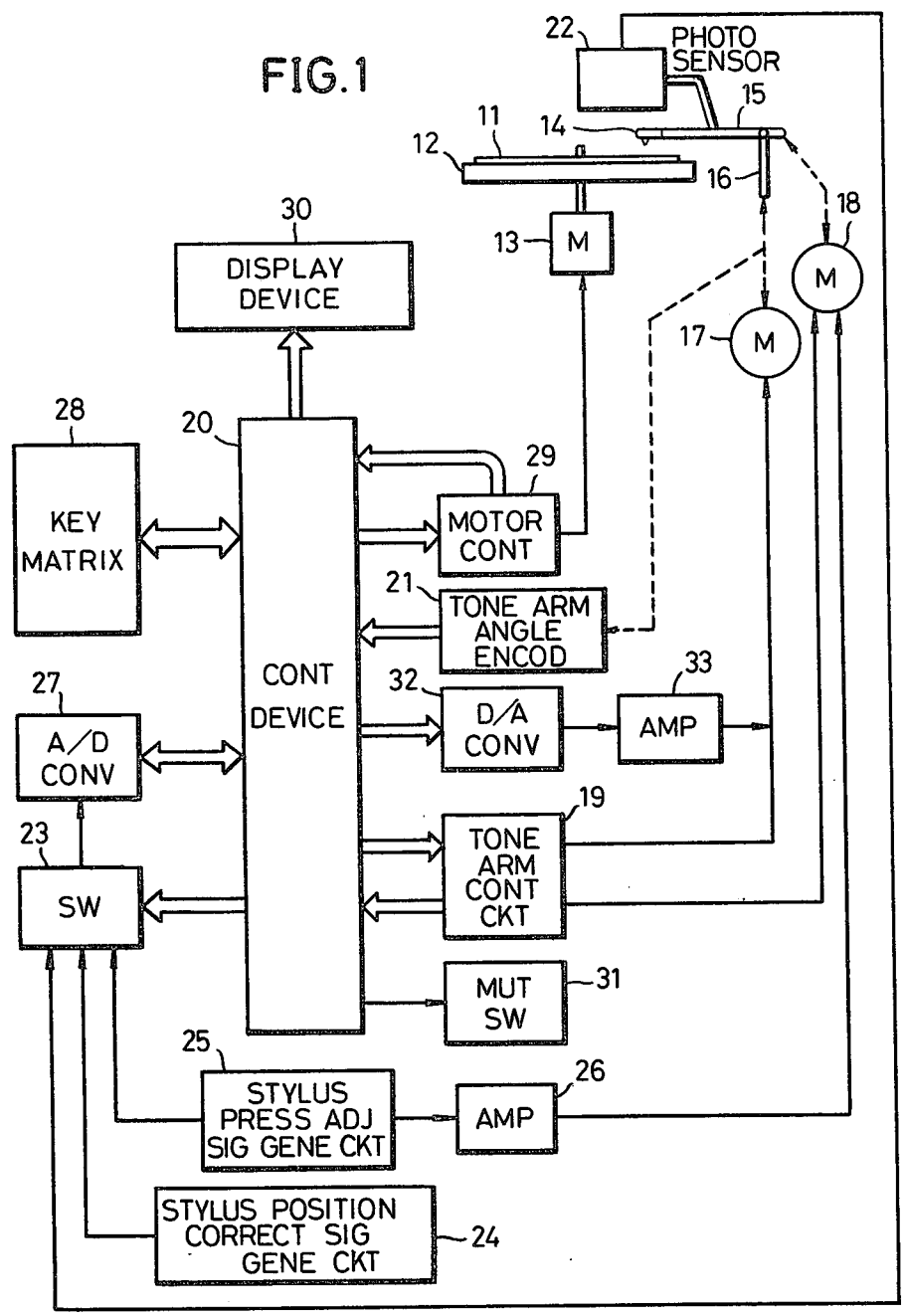
FIG. 1 is a block system diagram of one embodiment of a record disc playing apparatus having the automatic inside force cancelling function according to the present invention.

Referring first to FIG. 1, the block system diagram of the embodiment of the record disc playing apparatus according to the present invention will be described. A record disc 11 is placed on a turntable 12 driven by a motor 13 and is rotated at a specific rotational speed. In a position suitable for its operation with respect to the record disc 11, a tone arm 15 provided at its distal outer end with a pickup cartridge 14 is pivotally supported in a manner permitting it to swing freely horizontally and vertically on shaft 16.

An outside force for cancellation of the inside force is imparted in the horizontal swinging direction to this tone arm 15 by the operation of a horizontal drive motor 17. Furthermore, a force is imparted in the vertical rotational direction to the tone arm 15 by the operation of a vertical drive motor 18. The motors 17 and 18 are driven by output drive signals of a tone arm control circuit 19. The operation of this control circuit 19 is controlled by a control device 20. At the same time, this control circuit 19 supplies information relating to the state of the tone arm 15 to the control device 20.

As the pickup cartridge 14 traces the gound groove of the record disc 11 and the tone arm 15 swings horizontally, a tone arm angle encoder 21 of a construction as described hereinafter generates an address signal corresponding to the horizontal rotational angle of the tone arm 15. This output address signal of the encoder 21 is supplied to the above mentioned control device 20.

A photosensor 22 of a construction as described hereinafter is adapted to rotate unitarily with the tone arm 15 and produces a detection signal, as described hereinafter, which is applied to a changeover switch 23. A circuit 24 for generating signals for correcting the position of the stylus of the pickup cartridge 14 and a circuit 25 for generating signals for adjusting the stylus pressure, which respectively comprise, for example, variable resistors connected to a voltage source of constant voltage, are provided. From the sliding contacts of these circuits 24 and 25, a stylus position correcting signal and a stylus pressure adjusting signal are respectively led out and applied to the changeover switch 23. Furthermore, the stylus pressure adjusting signal from the signal generating circuit 25 is also applied by way of an amplifier 26 to the drive motor 18. The changeover state of the changeover switch 23 is controlled by a signal from the control device 20, and, in response to this control signal, the changeover switch 23 operates to selectively change over the signals applied from the photosensor 22 and the signal generating ciruits 24 and 25 and to supply the signals thus switched to an analog-to-digital (A/D) converter 27. The resulting output of the A/D converter 27 is fed to the control device 20.

This control device 20 comprises a microprocessor, random-access memory (RAM), read-only memory (ROM), and other components. The control device 20 is supplied with an information signals based on, for example, playing start, completion, programmed music piece numbers, and other information signals fed as input from a key matrix 28, an information signal relating to the state of the tone arm 15 from the tone arm control circuit 19, an address information signal from the encoder 21, an information signal relating to the rotational angle of the turntable 12 from a motor control circuit 29, and an information signal from the A/D converter 27.

The output of the control device 20 is fed also to a display device 30, a muting switch 31, and a digital-to-analog (D/A) converter 32. The output of the D/A converter 32 is applied by way of an amplifier 33 to the horizontal drive motor 17.

The construction of one embodiment of the aforementioned tone arm angle encoder 21 will now be described in conjunction with FIG. 2. A code plate 41 is horizontally fixed to the shaft 16 of the tone arm 15. This code plate 41 is provided therethrough with arcuate rows of through holes 42a through 42e of pattern arrangements according to respectively different codes, these rows being along respective arcs of circles of respectively different radii from the axis of the shaft 16 taken as a center. Above and below the code plate 41, there are respectively provided a row 43 of light source elements and a row 44 of photoelectric conversion elements respectively confronting the light source elements with the code plate 41 interposed therebetween. These rows 43 and 44 extend in the radial direction from the axis of the shaft 16 taken as a center, and the respectively confronting light source elements and photoconductive elements are disposed to register with the above described arcuate rows of through holes in the code plate 41.

The presence or absence of the through holes in the code plate 41 in register with the photoconductive elements of the row 44 differ with the angular position of the code plate 41. Accordingly, photoconductive elements coinciding with the code in the radial direction of the aligned through holes receive light from their corresponding light source elements. The resulting output signal of the photoconductive element row 44 is level selected by a level detection circuit (not shown) and rendered into a code signal, which is fed into the control device 20. This code signal corresponds to the angular position of the tone arm 15 and is an address signal indicative of the angular position of the tone arm.

As a modification of the above described embodiment of the invention, an encoder in which the code plate 41 is fixed, and the row 43 of light sources and the row 44 of photoconductive elements rotate horizontally together with the shaft 16 may be used.

As shown in FIG. 3, the aforementioned photosensor 22 has a case 51 which is open at its bottom and has a partition wall 52 separating the interior of the case into two chambers respectively accommodating a light source 53 and a light-receiving element 54. The case 51 is fixedly supported by a connecting beam 55 fixed to the tone arm 15. For this reason, the relative positional relationship between the tone arm 15 and the photosensor 22 remains unchanged even when the head shell 56 in which the cartridge 14 with the reproducting stylus 57 is mounted is disconnected from the tone arm 15 and exchanged with a head shell of another type. Therefore, the homologous relationship between the address of the position of the photosensor 22 and the output address signal of the above described encoder 21 is always constant irrespective of the exchanging of the head shell.

Then the address of the position 57a of the reproducing stylus 57 on the record disc 11, which address changes with the exchanging of the head shell, can be readily corrected with the address of the photosensor 22 as a reference datum. For this correction, it is necessary that, within the range of horizontal rotation of the tone arm 15, the difference between the addresses in the diametral direction of the turntable 12 corresponding respectively to the horizontal rotational position of the tip of the stylus 57 and the horizontal rotational position of the photosensor 22 be substantially constant. For this reason, the photosensor is so positioned that it traces a path coinciding substantially with the rotational path of the stylus 57 and, moreover, at the time of playing of the record disc, advances ahead of the stylus in the rotational direction of the tone arm 15. The above mentioned correction is performed by that stylus position correcting signal generating circuit 24 is adjusted, thereby adjusting the address of the position 57a stored within the control device 20.

The light from the light source 53 of the photosensor 22 is projected onto and reflected from the surface of the record disc 11, and the reflected light is received by the light receiving element 54. The state of the reflection of the light from the light source 53 at the surface of the record disc 11 is indicated in FIG. 4. In the case where an incident light 61a is projected onto walls of a groove 62 in the record disc 11, the light reflected by the walls of the groove 62 is directed toward the light-receiving element 54. Accordingly, when the incident light is being projected onto a part where there are many sound grooves 62, only a small quantity of reflected light reaches the light receiving element 54. On the other hand, in the case where an incident light 61a is projected onto a portion of many plannar parts 63 such as a soundless groove between sound grooves bands, and lead-in and lead-out groove parts, the greater portion of the light reflected at a plannar region 63 of this character is directed toward the light-receiving element 54. In the instant example, the diameter of the light spot is, for example, of the order of 2 to 3 mm.

Figure 5:
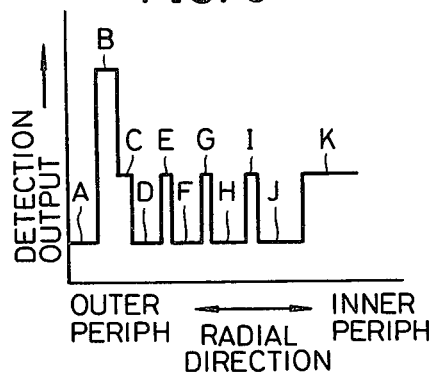
FIG. 5 is a graph indicating the variation of the output of light reception detection which occurs when the photosensor is moved over the record disc in a radial direction thereof.

Accordingly, the light detection output of the light receiving element 44 at the time when the tone arm 15 is caused to swing horizontally from its rest position outside of the turntable 12 to the innermost recording position of the record disc becomes as indicated in FIG. 5. In the graph of FIG. 5, the ordinate represents detection output, while the abscissa represents positions in the radial direction of the record disc, the outer periphery of the record disc being toward the left and the center of the record disc being toward the right. In this graph, the ordinate indicates the detection output of the light receiving element 54 when the light from the light source 53 is projected onto various parts, namely, the motor board surface as indicated at portion A, the turntable surface as indicated at portion B, the unrecorded parts between recorded pieces on the record disc as indicated at portion B, the unrecorded parts between recorded pieces on the record disc as indicated at portions C, E, G, and I, and recorded parts on the record disc as indicated at portions D, F, H, and J.

Because, in this manner, the light reflection factor of the turntable and that of the lead-in portion of the periphery of the record disc 11 are different, the lead-in portion of the record disc 11 can be positively detected. Therefore, the diametric size of the record disc can be automatically discriminated at the time of automatic playing of the record disc as described hereinafter, and the reproducing stylus is automatically and positively lowered into the lead-in groove of the record disc.

The detection output of the analog signal of the photosensor 22 is supplied via the switch 23 to the A/D converter 27 to be converted into a digital signal, which is then fed into the control device 20.

The motor control circuit 29 generates a driving voltage in response to a control signal from the control device 20 and applies this voltage to the motor 13. From the motor control circuit 29, an information relating to the angular position of the turntable 12 is supplied as an information signal for correcting the address in the diametric direction of the record disc, which varies with the eccentricity, to the control device 20.

When the tone arm 15 is lowered, and the stylus 57 contacts the record disc 11, noise is generated. The muting switch 31 has the function of muting to prevent this noise from occurring in the reproduced sound and is controlled by a signal from the control device 20.

The control device 20 refers to a table of a memory circuit, within the control device 20, in which is stored information relating to the magnitude of the inside force corresponding to the rotational angular position of the tone arm 15 and supplies a signal of an outside force for canceling the inside force to the D/A converter 32. The D/A converter 32 converts the digital signal (for example, a signal of an information of the order of, for example, binary six digit, that is, 6 bits, is sufficient) supplied from the control device 20 into an analog signal, which is applied by way of the amplifier 33 to the horizontal drive motor 17, thereby carrying out cancellation of the inside force.

Figure 6:
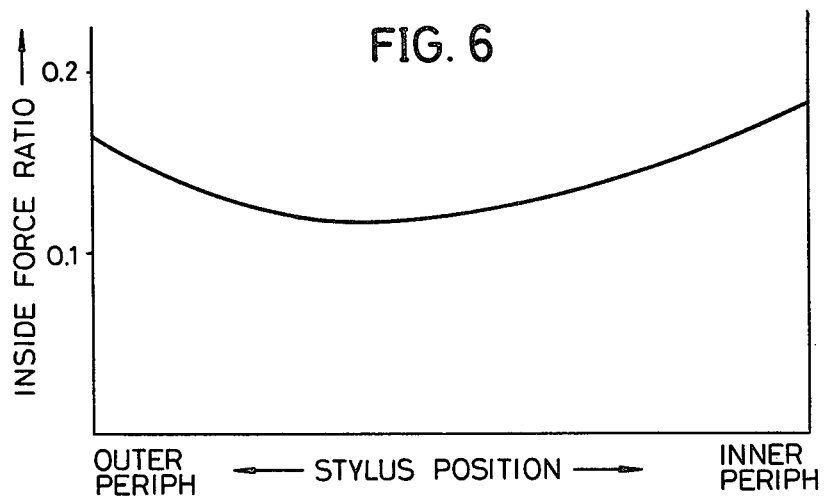
FIG. 6 is a graph indicating the variation of the inside force ratio with the position of the reproducing stylus.

The inside force varies also with variation of the value of the stylus force. The abscissa of the graph in FIG. 6 represents the rotational position of the reproducing stylus, that is, the address position. The left-hand side indicates the outer peripheral side of a 30-cm. record disc, while the right-hand side indicates the 17-cm. inner periphery of the recorded grooves. The ordinate represents the variation of the inside force due to the variation of the stylus force in terms of inside force ratio (equal to (inside force)/(stylus pressure)). The values of the inside force ratio thus depending on the address position are stored in the memory circuti within the control device 20.

The signal supplied from the control device 20 to the D/A converter 32 is an inside force cancellation signal (outside force signal) obtained by a product of a digital signal indicating the magnitude of the inside force corresponding to the address of the reproducing stylus read out from the memory device within the control device 20, a digital signal obtained when a signal indicative of the stylus force which has been generated by the stylus pressure adjusting signal generating is converted in the A/D converter 27, the inside force ratio as indicated in FIG. 6.

Figure 7A:
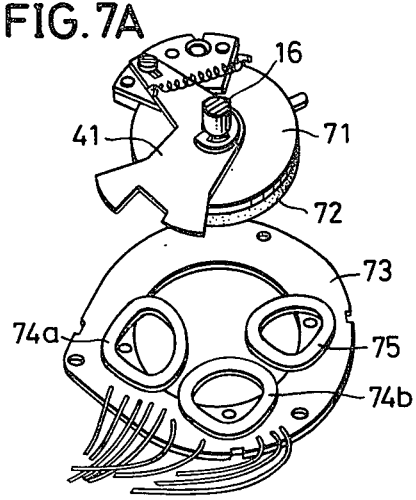
FIGS. 7A and 7B are respectively an exploded perspective view and a plan view showing one example of a horizontal drive motor according to the invention in the apparatus shown in FIG. 1.
Figure 7B:
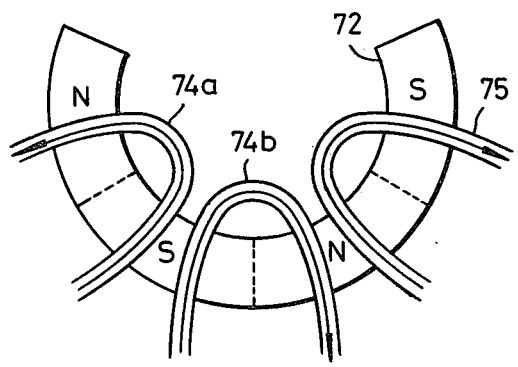

An exploded perspective view of the essential parts of one example of the horizontal drive motor 17 according to the invention is shown in FIG. 7A. A yoke 71 and a permanent magnet 72 of arcuate shape are fixed to the shaft 16 to rotate unitarily therewith. At positions to confront the magnet 72, horizontal drive coils 74a and 74b and a horizontal speed detection coil 75 of flat ring shape are fixedly mounted to lie in a single horizontal plane on a horizontal holding ring 73. The magnet 72 has been magnetized to have magnetic poles N and S in alternate disposition as shown in FIG. 7B.

For rotating the tone arm 15 at the start and the completion of automatic playing of a record disc, a driving current is passed from the control circuit 19 respectively in a specific direction and the reverse direction through the drive coils 74a and 74b. As a result of the magnetic field established by the driving coils 74a and 74b, a torque is imparted to the magnet 72, whereby the tone arm 15 is swung from the arm rest position to the lead-in position and, when the driving current direction is reversed, from the lead-out position to the arm rest position. On the other hand, during record playing, there is no output from the control circuit 19, and a signal current from the amplifier 33 is passed through the drive coils 74a and 74b, whereby a torque in the direction of the outside force is imparted to the tone arm 15 thereby to cancel the inside force.

In accordance with the present invention, when the stylus pressure has been adjusted, inside force cancellation is automatically carried out in an accurate manner in accordance with the value of the adjusted stylus pressure. While the vertical drive motor 18 not illustrated or described in detail, it has a construction similar to the horizontal drive motor 17 and comprises, essentially, a yoke, an arcuate permanent magnet mounted on the yoke, and flat vertical drive coils and a vertical speed detection coil supported to lie in one vertical plane.

The address signal from the encoder 21 and the detection signal from the photosensor 22 are stored in a memory device comprising the RAM within the control device 20. The control device 20 is capable of reading out the values of these two signals thus stored and of carrying out comparison operation. Then, prior to automatic playing of a record, position such as the lead-in position at the outer periphery of the record disc and the positions of unrecorded separation band between adjacent music pieces are determined as address positions in the radial direction of the turntable 12 and thus stored in the memory device. As a result of this preparation, at the time of automatic record playing, the reproducing stylus is lowered accurately in the unrecorded separation band between music pieces immediately before a desired music piece.

The address signal from the encoder 21 and the signal which has been sent out from the stylus position correcting signal generating circuit 24, and which has passed through the A/D converter 27, are subjected to subtraction within the control device 20, and an accurate address signal in the radial direction of the turntable 12 of the position of the tip of the reproducing stylus is obtained. Therefore, even when the pickup cartridge is replaced, and the tip position of the reproducing stylus changes, a signal corresponding to the correct address in the radial direction of the turntable of the stylus can always be obtained and used for various operations of automatic record playing.

Furthermore, by using the signal corresponding to the rotational angular position of the turntable 12, which signal has been obtained form the motor control circuit 29 and stored and the detection signal indicative of quantities such as the height of the tone arm 15 and the lowering speed thereof in the vertical direction, the relationship between the rotational angular position of the turntable prior to the descent of the tone arm and that at the time when the stylus contacts the record disc is obtained. Then, from the turntable angular position at any chosen time, the time instant at which the stylus will contact the record disc can be calculated. As a result, even if there is an eccentricity in the record disc, the reproducing stylus will always be lowered accurately at the lead-in position or the position of a band between recorded pieces of the record disc.

In this connection, the control device 20 may be so preset that, after completion of the playing of the pieces of all stored program numbers, without erasing during the record playing the numbers of the programs previously stored, the pieces of the above mentioned previously stored program numbers are again automatically played in a specific sequence as a result of instruction by the key-matrix 28 for a second start of record playing. Furthermore, the control device may be so adapted that, upon completion of the record playing, the signal for start of record playing is generated to cause a repetition of the automatic record playing. In addition, control may be so exercised that, upon completion of the record playing, a playing start signal is generated to cause the start of record playing of other record disc playing apparatuses.

The muting switch 31 is so controlled by a control signal from the control device 20 that it assumes its "OFF" state prior to the contacting of the reproducing stylus against the record disc surface and assumes its "ON" state after the elapse of a specific time interval from the instant of contact of the stylus against the record disc surface or after an address variation. For causing this muting switch 31 to assume its "ON" state, a desirable organization of apparatus is one wherein: the vertical lowering speed signal of the tone arm 15 is detected; a comparator for generating an output signal when a speed-proportional signal voltage becomes lower than a predetermined voltage value is used; a time measuring means is started by the output of the comparator; and the muting switch 31 is caused to assume its "ON" state by the output of this time measuring means.

Furthermore, the detection of the peak value with respect to the detection output from the photosensor 22 is not limited to that depending on the use of a specific threshold, it being possible also to increase the reliability of detection of bands between recorded pieces by detecting the sharpness of the peak, the height of the peak, the difference of ratio between the heights of the ridges and the valleys, and other features.

By variably adjusting the variable resistor of the stylus position correcting signal generating circuit 24, the address of the tip position of the reproducing stylus can be finely varied. Therefore, even when a variation in the position of the stylus tip is caused by an interchanging of the head shell, adjustment can be so carried out that the stylus will be lowered accurately into an unrecorded part of the sound groove between recorded music pieces. Furthermore, adjustments can be readily made to compensate for irregularities of lead-in address for record disc of various diametric sizes.

The operation of the apparatus of the present invention will be described in detail with reference to the block diagram of FIG. 1 and flow charts of FIGS. 8 and 9.

A step 81 indicates the START of the operational sequence of the control device 20, which may be a microcomputer. Namely, when the power switch (not shown) of the apparatus is put into a stand-by state, the control device becomes operable, and then the operator or user of the apparatus manipulates a key of the key matrix 28 to enter necessary information, such as predetermined pieces of music to be played in a sequence. In a following step 82, the control device 20 reads the information or data from the key matrix 28, and detects what kind of commands have been given. In case that the command from the key matrix 28 is to program predetermined pieces of music, a following step 83 takes place to store the output signals of the key matrix 28 in the memory device (RAM) of the control device 20, in the selected order. Such information of pieces of music selected will be displayed at the display 30 so that the user can ascertain what have been selected.

In a case where the command from the key matrix 28 is to reject the tone arm of the record player, a step 84 takes place to return the pickup arm 1 to the arm rest and to cancel programed information if any. In this case, the control device 20 sends and receives the necessary signals to and from the tone arm control circuit 19.

In a case where the command from the key matrix 28 is to play, a step 85 takes place to lift the tone arm from the arm rest. In this case, the control device 20 sends and receives the necessary signals to and from the tone arm control circuit 19.

This tone arm control circuit 19 comprises a driving circuit which produces two driving currents respectively applied to the horizontal drive motor 17 and vertical drive motor 18, and a detecting circuit which detects the situation of the tone arm 15. In detail, the increase in each of driving currents is detected to see whether the tone arm 15 has reached a stopper which is arranged to abut against the tone arm when the tone arm is lifted vertically; to see whether the tone arm has reached a second stopper which is arranged to abut against the tone arm when the tone arm is horizontally rotated toward the center of the turntable excessively; and to see whether the stylus is placed on the surface of the record disc. The detected data are applied to the control device 20 so that the control circuit 19 with control signals by which the driving currents are controlled to lift, lower, horizontally rotate in both directions, support and stop the tone arm. This means that the tonearm 15 can be freely controlled in accordance with various commands applied from the key matrix 28. The driving current of the vertically driving motor 18 can be further controlled in accordance with the output signal of the amplifier 26 to adjust the stylus pressure, as will be described hereinafter, when the stylus is placed on the surface of the disc 11.

After the step 85, it is detected whether a disc 11 is on the turntable 12 in a step 86. In this step 86, not only the presence of a disc but also the size, i.e. the diameter, of the disc, such as 30, 25 or 17 cm, if a disc on the turntable 12 is detected, is detected. If the answer of this step 86 is NO, namely, if no disc is detected, the program sequence enters into the aforementioned step 84. On the other hand, if the presence of a disc is ascertained, a following step 87 takes place in which it is detected whether there are any programed pieces of music. If the answer of this step 87 is YES, i.e. when at least one piece of music has been programed to be played back, a following step 88 takes place to detect the unrecorded separation bands by the photo sensor 22. On the contrary, if the answer of this step 87 is NO, reads the address signal from the angle encoder 21. Namely, the horizontal angle of the tone arm 15 is detected. In a step 94, it is detected whether the arm angle is the maximum in the tone arm 15 is lifted and turned horizontally to the lead-in position of the outer peripheral part of the record disc in accordance with the size, i.e., the diameter of the disc detected in the step 86.

Detecting of the size of the record disc at the step 86 is performed by steps shown in the flow chart of FIG. 9. In a step 92, the tone arm 15 is upwardly rotated in a vertical plane by the vertical drive motor 18 until it contacts an upper limiting stopper, thereafter, the tone arm 15 is horizontally rotated by the horizontal drive motor 17. In a following step 93, the control device 20 reads the address signal the angle encoder 21. Namely, the horizontal angle of the tone-arm 15 is detected. In a step 94, it is detected whether the arm angle is the maximum in the possible rotational angle of the same. Namely, it is detected whether the tone arm 15 is located in the innermost position with respect to the turntable 12. If the horizontal rotational angle of the tone arm 15 is the maximum, the answer of the step 94 is YES, namely, the tone arm 15 is located in the innermost position, no disc is on the turntable 12. In this case, the operation is returned to the step 84, playback cannot be performed and thus the tone arm 15 will be returned to the arm rest. When the answer of the step 94 is NO, namely, the tone arm 15 is not located in the innermost position, the operation proceeds to a step 95. At the step 95, the output signal of the photo sensor 22 is stored in a memory through the switching circuit 23 and the A/D converter 27. The output digital signal of the A/D converter 27 is stored in the memory device of the control device 20.

In the following step 96, the control device 20 compares the past maximum value stored at the step 95 and the present new value. When the comparison result becomes a predetermined value, passed through the lead-in portion of the record disc. In this case the answer of the step 96 becomes YES and a following step 97 takes place to detect the size or diameter of the disc. Namely, when the answer of the step 96 is YES, the horizontal rotational angle of the tone arm 15, which is indicated by the arm angle encoder 21, is compared with prestored values indicative of different sizes of discs so that the size of the disc on the turntable is determined. If the answer of the step 96 is NO, the program sequence returns to the step 93. After the record disc size is detected in the step 97, the program enters into the step 87 of FIG. 8 as described hereinabove.

The horizontally rotating speed of the tone arm 15 is controlled in such a manner that the period of time required for performing the operations of steps from 93 to 96 is shorter than the interval between two consecutive output coded signals from the arm angle encoder 21. Accordingly, a high accuracy in the lead-in part detection is obtained.

Referring back to FIG. 8, in steps similar to the steps 92~97 explained with respect to the step 86 in conjunction with FIG. 9, the address values of the unrecorded separation bands of the record disc are sequentially stored in the memory device of the control device 20 at the step 88. In the step 88, the address values corresponding to the peak of the stored past value are sequentially stored in the memory device of the control device 20. At the same time, the information of the rotation angle of the turntable 12 supplied to the control device from the motor control circuit 21 is also stored in correspondence with the address of the above described peak value.

In the following step 89, the programed information as to the pieces of music is read out. The correction of address value corresponding regions of non-recording (lead-in part or separation bands) just before the recorded region of the music piece to be reproduced is performed with utilizing the signal produced by the stylus position correction signal producing circuit 24 and converted by the A/D converter 27. The motors 17 and 18 are supplied with the driving electric power by the tone arm control circuit 19, whereby the tone arm 15 is lifted and thereafter rotated horizontally towards inner periphery of the record disc until the corrected address value coincides with the address value of the address signal from the encoder 21. When the tone arm 15 reaches the above address position, the horizontal rotation of the tone arm 15 is stopped and then the tone arm 15 is lowered by the vertical drive motor 18. In the step 89, the information of rotation angle of the turntable 12 stored at the step 88 is read out. So as to coincide the time point when the stylus contacts the record disc with the time point of the rotation angle of the above described information of the rotation angle, a necessary waiting time is provided in the result that lowering start time is calculated with a lowering necessary time of the stylus and rotation period time of the turntable. If the record disc has an eccentricity, the stylus contacts precisely the predetermined position on the record disc surface. The above described switch-on and off operations of the muting switch 31 is performed in the step 89.

In the step 90, after the stylus 14 contacts the record disc, the vertical drive motor 18 is supplied with a driving current to cause the tone arm 15 to lower. After the stylus 14 contacts the record disc, the driving current to be supplied to the vertical drive motor 18 is abruptly increased. Utilizing this phonomenon, when the magnitude of the driving current for the vertical drive motor 18 exceeds the predetermined value, a signal is produced and then supplies to the control device 20. The control device 20 supplied the control signal to the tone arm control circuit whereby the driving current to be supplied to the vertical drive motor 18 is decreased.

The vertical drive motor 18 is supplied with the predetermined constant current so that the stylus contact the record disc surface with the predetermined stylus pressure. Accordingly, in order that the stylus contacts the record disc surface with the predetermined stylus pressure while the stylus traces a sound groove of the record disc, the voltage from the stylus pressure adjusting signal generating circuit 25 is amplified at the amplifier 26 and then supplied to the vertical drive motor 18. On the other hand, the output of the stylus pressure adjusting signal generating circuit 25 is supplied to the A/D converter 27 through the swtich 23 where it is converted into a digital signal. This digital signal is supplied to the decoder of the control device 20 where it is decoded and thereafter supplied to the indicator 30 to indicate the stylus pressure. The indicator 30 indicates the music piece number which is played at present, the music piece number to be played next, and the number of the remaining programed music pieces.

The control device 20 reads the address signal from the encoder 21, and produces a signal for cancelling the inside force by operating and calculating the digital signal obtained from a table of the memory device storing the information of the magnitude of the inside force corresponding to the address of the stylus, the digital signal obtained by that the signal produced by the stylus pressure adjusting signal producing circuit 25 and converted, and the inside force ratio corresponding to the address of the stylus position. The inside force cancel signal is supplied to the D/A converter 32. The signal converted at the D/A converter 32 is amplified at the amplifier 33 and then supplied to the horizontal drive motor 17 as the inside force cancel driving signal.

The control device 20 compares the output signal of the encoder 21 and the address signal corresponding to the position of the unrecorded separation bands stored upon programing, and detects that both signals coincide each other or the former signal exceeds the latter signal. The control device 20 then supplies the control signal to the tone arm control circuit 19, whereby the tone arm 15 is rotated upwardly. In the above described comparison, in a case where the address values of both signals have not coincided, the operation of the apparatus returns to the stylus pressure indication operation, whereby the comparing of addresses is repeated. As similarly in the step 88, this comparison is performed when the rotation angle of the turntable coincides with the stored value, whereby the occurrence of errors due to eccentricity of the record disc is prevented.

In a case where a step 91 judges the fact that, the programed music pieces are remaining after the tone arm 15 is lifted, the operation returns to the step 89 and operations after the step 89 are performed. On the other hand, in a case where the step 91 judges the fact that no programed music piece is remained, the operation proceeds to the step 84 whereby rejection operation is performed.

Further, this invention is not limited to these embodiments but various variations and modifications may be made without departing from the scope of the invention.

What we claim is:

1. A record disc playing apparatus comprising:
    a horizontal drive motor for imparting a horizontal rotational force to a tone arm;
    address signal generating means for generating an address signal corresponding to a horizontal rotational angle position of the tone arm; and
    a control device including a memory device for storing the magnitude of an inside force introduced with respect to the tone arm correspondingly with the horizontal rotational angle position of the tone arm,
    said address signal generating means supplying the generated address signal to the control device,
    said control device reading out the magnitude of the inside force from the memory device corresponding to the supplied address signal, and producing a signal for cancelling the inside force at the rotational angle position of the tone arm corresponding to the read out magnitude of the inside force and supplying the same to the horizontal drive motor.

2. A record disc playing apparatus as claimed in claim 1, which further comprises a photosensor fixed to the tone arm, and in which said photosensor comprises a light source for emitting light onto the record disc surface and a light receiving element for receiving light reflected at the record disc surface, said photosensor discriminating recorded sound groove portions and unrecorded portions on the record disc, said photosensor supplying the output thereof to the control device.

3. A record disc playing apparatus as claimed in claim 1, in which said address signal generating means comprises a code plate provided horizontally to rotate unitarily with rotation shaft of the tone arm, a row of light emitting elements provided in opposed relation to one surface of the code plate, and a row of light receiving elements provided in opposed relation to the other surface of the code plate, said plate being provided with rows of through-holes disposed arcurately and with different radii, the disposition of said through-holes being determined by the predetermined code.

4. A record disc playing apparatus as claimed in claim 1, which further comprises a digital-to-analog converter which is supplied with a signal corresponding to the outside force read out from the control device and converts the same into an analog signal, and an amplifier for amplifying the output of the converter and supplying the horizontal drive motor.

5. A record disc playing apparatus as claimed in claim 1, which further comprises a circuit for generating a stylus pressure adjusting signal, and an analog-to-digital converter which is supplied with the stylus pressure adjusting signal from said generating circuit, converts the same into digital signal and supplies the output digital signal to the control device, and in which said control device produces the inside force cancelling signal by operating and calculating a digital signal of the information of the magnitude of the inside force read out from the memory device, the stylus pressure adjusting signal from the analog-to-digital converter, and an inside force ratio corresponding to an address of the supplied address signal.

6. A record disc playing apparatus as claimed in claim 1, in which said horizontal drive motor comprises a permanent magnet of an arcuate flat plate configuration provided to rotate unitarily with the rotational shaft of the tone arm, said permanent magnet having N-poles and S-poles each of which is alternately disposed, and a flat coil disposed in opposed relation to the permanent magnet, said coil being supplied with the inside force cancelling signal.

7. A record disc playing apparatus as claimed in claim 1, which further comprises a circuit for generating a stylus position correction signal, said stylus position correction signal being supplied to the analog-to-digital converter, and in which said control device corrects the address of the stylus position with the use of the stylus position correction signal supplied from the analog-to-digital converter.

* * * * *